(No Model.)
E. THOMSON.
AUTOMATIC HAMMER.
No. 455,905. Patented July 14, 1891.
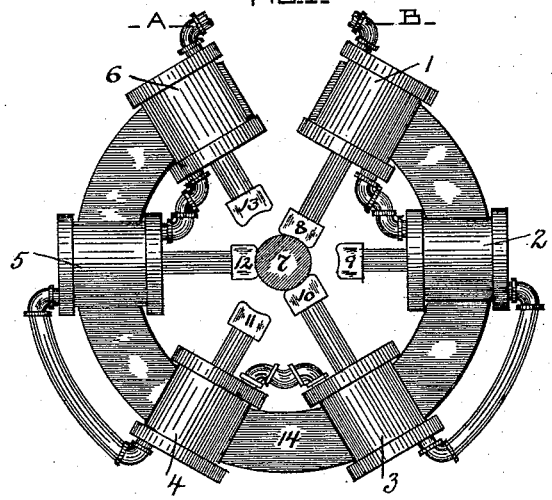
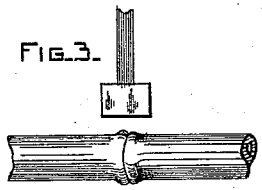
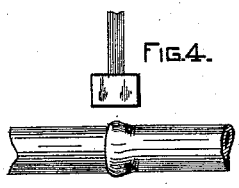
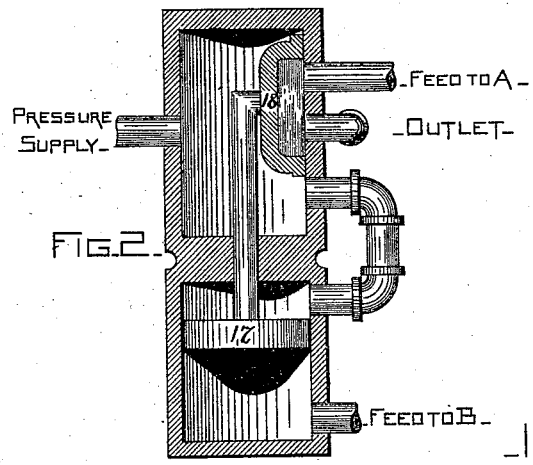
WITNESSES
T. F. Courey
Wm. H. Capes
INVENTOR
Elihu Thomson
By H. C. Townsend
Atty.

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

AUTOMATIC HAMMER.

SPECIFICATION forming part of Letters Patent No. 455,905, dated July 14, 1891.

Application filed December 29, 1890. Serial No. 376,165. (No model.)

*To all whom it may concern:*

Be it known that I, ELIHU THOMSON, a citizen of the United States, and a resident of Swampscott, in the county of Essex and State of Massachusetts, have invented certain new and useful Automatic Hammers, of which the following is a specification.

My invention relates to a hammering, swaging, or similar forming apparatus adapted to operate upon work placed at a common center of action of the parts of the apparatus, each of which comprises a reciprocating member bearing a tool.

My invention is designed especially to provide a means whereby the burr or expansion formed by an electric welding or similar operation may be expeditiously reduced or removed or may be prevented from forming during the welding operation.

The invention consists, essentially, in the combination of a number or series of reciprocating plungers or tool-carrying devices operating on converging or meeting lines and carrying tools, such as hammers, swages, or compressing-instruments, adjacent ones of which have impact or pressure faces which cover overlapping surfaces of the work, said plungers or tool-carrying devices being made to reciprocate or act in rotation or in succession or alternately and singly or in sets, according to the total number employed. By these means the whole surface to be worked, as the whole periphery of a welded bar or pipe, may be quickly and thoroughly manipulated without interference of the tools with one another and with no (or at the most very slight) turning of the frame or support for the tools around the work or turning the work under the tools.

My invention consists, further, in the special combinations of devices hereinafter described and claimed.

In carrying out my invention I prefer to mount the tools directly upon plungers, which may be reciprocated by air or other pressure operating on pistons; but the tools may be otherwise mounted and made to reciprocate by other power without departing from my invention.

While I have shown my invention as applying to two sets only of hammers which alternately make strokes upon the work, it is evident that three or more sets might be used, or the hammers might be caused to descend singly and in rotation in any desired order around the work. The hammers may, as stated, remain stationary in position as related to the work, or they might even be slightly rocked from side to side, so as to cause them to more effectively cover the work.

In the accompanying drawings, Figure 1 is a side elevation of an apparatus embodying my invention. Fig. 2 is a vertical section through an automatic valve mechanism and arrangement of pipes which may be employed, if desired, for producing reciprocation of the pistons or plungers carrying the tools. Figs. 3 and 4 show kinds of work with which the tool may be used.

In Fig. 1 I have shown a series of six hammers or swages numbered 8, 9, 10, 11, 12, and 13, which may be operated in rotation and either as a single set or as two or three sets. In the present instance I have shown them as provided with means for operating them as two sets and alternately. Those tools numbered 8 10 12 are the tools of one set and tools 9 11 13 the tools of the other set. As will be seen, the impact or pressure faces of adjacent tools cover surfaces of the work which would overlap, so that by the employment of a sufficient number of tools to surround the whole work the reciprocation of them will produce the desired operation upon the whole surface of the work without necessarily turning them around the work or turning the work itself to bring different parts of it into different relation with the hammers. As the hammers 8 10 12 move in toward the work the hammers 9 11 13 are moved outward, thus making way for the first-named hammers to engage with the work. Conversely as the hammers 9 11 13 move inward the hammers 8 10 12 are moved outward and make way for the action of the second set.

14 is a suitable frame carrying the apparatus and having mounted upon it cylinders 1 2 3 4 5 6, containing pistons or plungers whose rods carry the hammers or other tool. By means of such plungers and cylinders and by the proper arrangement of pressure and exhaust openings the tools may be reciprocated in the desired rotation or succession. Other means might be employed for reciprocating the tools.

The arrangement of pipes which I have herein shown and which I prefer to employ comprises two pipes A B, which may be used alternately as exhaust and pressure pipes and connections between the cylinders of the various plungers, as shown, so that as one cylinder is moved in by the operation of pressure applied at its outer end the compression at the inner end of the same cylinder may be communicated to the inner end of another cylinder and move the piston therein outward. This arrangement, which applies particularly to a combination wherein two sets of tools are employed, is illustrated in the drawings, where the inner end of cylinder 6 communicates with the inner end of the adjoining cylinder 5 of another set of tools. The outer end of cylinder 5 communicates with the outer end of cylinder 4, the inner end of 4 with the inner end of 3, and so on to cylinder 1, the upper end of which connects with pipe B. The spaces in the cylinders 6, 5, 4, 3, &c., connected by such pipes, may contain air, gas, or other fluid, but preferably for rapid operation and where the hammering action is desired should contain an elastic fluid, such as air or gas.

By means of a suitable valve or other arrangement the parts A B may be made to act alternately as pressure and exhaust pipes, and the tools will then obviously be made to reciprocate in two sets and alternately. Thus, for instance, pressure applied at A forces the piston-carrying tool 13 inward, and such pressure being communicated through the pipe connecting the inner end of 6 with the inner end of 5 will force or move the tool 12 outward. The movement of the piston in 5 will obviously by the connecting-pipe produce pressure which will force the piston of 4 inward, and in the same manner tool 10 will move outward, tool 9 inward, and tool 8 outward, the whole operation being of course assisted by the exhaust for the time being existing in the pipe or passage B. If after this pressure were applied at B, hammer 8 would descend, hammer 9 would be raised, hammer 10 descend, hammer 11 be raised, hammer 12 would descend, and hammer 13 would be raised, and they would then be in the position shown in the figure. By causing alternations of pressure to exist through A and B alternately it is evident that the hammers would rise and fall with a rapid succession of blows, and the effect on the work would be to apply blows at alternating positions in places where the hammers are made to cover the work, and it is evident that all parts will receive a vigorous hammering.

The special arrangement shown is a convenient one for obtaining pressure and exhaust or relief of pressure at the ends of the cylinders alternately to cause the pistons to operate in the desired alternation or rotation; but it will be obvious that other connections of pipes might be employed and that the desired operation would be obtained by producing exhaust or pressure in the cylinders in the proper order or rotation and at the proper ends of the same. The cylinder-heads may be made and connected as shown, and connections be made in other ways to a source of pressure independently, it only being necessary to cause the pressure to be put on alternately on the different cylinders, so as to keep the hammer-heads out of actual contact in descending or rising.

Figs. 3 and 4 simply exhibit the kind of work which is to be hammered by this device. The electric weld, which is shown in Fig. 3, is a raised portion, which may be considered as a double bar or expansion. This is to be hammered down flat by the successive blows of the hammer overlapping.

In Fig. 4 there is seen a single raised portion which is to be hammered down flat. Either of these may relate to pipe-welding or to solid bar-welding, as the case in point may be. A single supply of pressure of air may cause the reciprocating actions just mentioned by particular valve devices arranged for this purpose. It may be made automatic or it may be set in motion by any other device—that is, it may be done by hand or it might be made to vibrate in its own time. For example, Fig. 2 shows a valve which will reciprocate and supply pressure alternately to feed-pipe A and feed-pipe B, which are marked on the figure. The pressure-supply being put on suddenly would of course cause the lower piston 17 to descend by direct communication with the upper portion of the piston-supply, and that would carry the valve 18 so as to uncover the port leading to A, at the same time covering the exhaust from the upper part of the cylinder and the outlet, enabling a return motion of the piston 17 to be made by the pressure exerted through the supply to A and through the line of cylinders, Fig. 1, to B, back to the lower portion of the piston 17. When the valve is again thrown into position, (shown in the figure,) the pressure would again act upon the top of the piston 17, sending it back again and shifting the valve once more. These alternations of position will continue and the result will be that the pressure will be exerted alternately at A and B, Fig. 1, which are connected as in Fig. 2, as indicated by the letters, and the pistons will reciprocate in the cylinders at 2, 3, 4, 5, and 6 automatically.

What I claim as my invention is—

1. The combination, substantially as described, of a number of reciprocating hammers or tools operating in succession or rotation or alternately on converging or meeting lines and each having an impact or pressure face which covers or overlaps the surface of the work acted upon by an adjacent hammer or tool.

2. The combination, substantially as described, of a series of reciprocating plungers or tool-carrying devices operating on converging or meeting lines and carrying tools, such as hammers, swages, or compressing-instruments, the adjacent ones of which have impact or pressure faces which cover overlapping surfaces of the work, said plungers or tool-carrying devices being made to reciprocate or act in rotation or succession, as and for the purpose described.

3. The combination, substantially as described, of two or more sets of reciprocating plungers working on converging lines and carrying hammers, tools, or other devices the impact or pressure faces of which cover overlapping surfaces of the work.

4. The combination, substantially as described, of a series of successively or alternately acting tools reciprocating on converging or meeting lines and having impact or pressure surfaces covering overlapping surfaces of the work.

5. In a pneumatic tool, the combination, substantially as described, of two or more sets of cylinders carrying pistons which work on converging lines and bearing at their inner ends tools or swages which have impact or pressure faces covering overlapping surfaces of the work.

6. The combination, in a pneumatic tool, of a series of cylinders divided into sets and carrying pistons which operate upon tools or swages arranged to surround the work, and means for causing the pistons of the sets to reciprocate alternately or in rotation, as and for the purpose described.

7. In a pneumatic tool, the combination, substantially as described, of two or more tool-operating pistons, a connection from one end of the cylinder for one piston to a pipe in which alternate pressure and relief of pressure may be produced, and a connection from the opposite end of said cylinder to the same end of another piston, whereby the tools carried or operated by the pistons may be made to act in rotation or succession.

8. The combination, substantially as described, of a series of cylinders divided into two sets and having plungers or pistons which reciprocate on converging lines, hammers or tools operated by said pistons, and connections between the inner and the outer ends of different cylinders, whereby through the application of pressure or exhaust to other cylinders the pistons of the two sets may be caused to reciprocate in alternation, as and for the purpose described.

9. The combination, substantially as described, in a pneumatic tool, of a series of pistons carrying tool-operating plungers which operate on converging lines, pressure and exhaust pipes A B, connected to the same ends of different cylinders, and connections alternately between the inner ends and the outer ends of adjacent pistons, whereby said pistons may be caused to reciprocate in two sets and alternately in a direction to move the hammers or swages inward.

10. In a pneumatic tool, an automatic valve movement for producing alternate pressure and exhaust in a series of pistons having connected cylinders, comprising a piston 17, a connection from one end of the cylinder of said piston to a pressure-supply chamber, connection from the opposite end of said cylinder to one end of the series of pistons, and a valve 18, reciprocated by said piston and acting to control an exhaust-opening and connections to the opposite end of the series of pistons and to the cylinder for piston 17, as and for the purpose described.

11. The combination, in a pneumatic tool, of a pipe A, connected to the end of a cylinder wherein alternate pressure and exhaust are to be produced, a pipe B, connected to the end of the cylinder wherein alternate exhaust and pressure are to be produced simultaneously, and an automatic valve-movement having a piston working in a cylinder, whose end opposite the pressure and exhaust end thereof is continuously connected with one of said pipes A B, and a valve operated by said piston and acting to alternately connect the other pipe and the pressure-space of said piston with a source of pressure and an exhaust.

Signed at Lynn, in the county of Essex and State of Massachusetts, this 22d day of December, A. D. 1890.

ELIHU THOMSON.

Witnesses:
 JOHN W. GIBBONEY,
 BENJAMIN B. HULL.